P. JACOBS.
FIRE EXTINGUISHER.
APPLICATION FILED JULY 3, 1920.
1,389,049.
Patented Aug. 30, 1921.
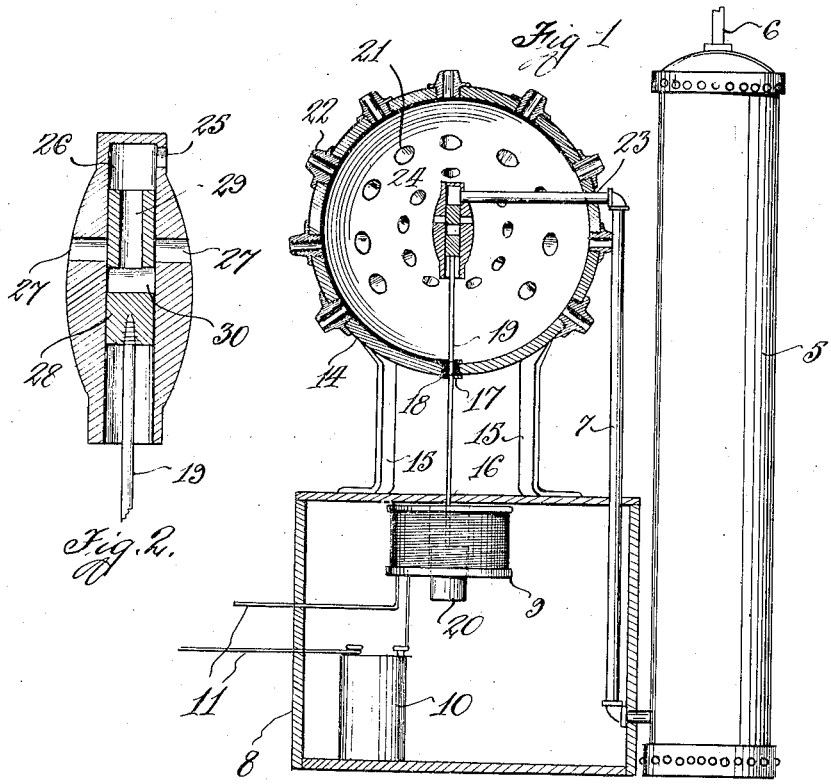
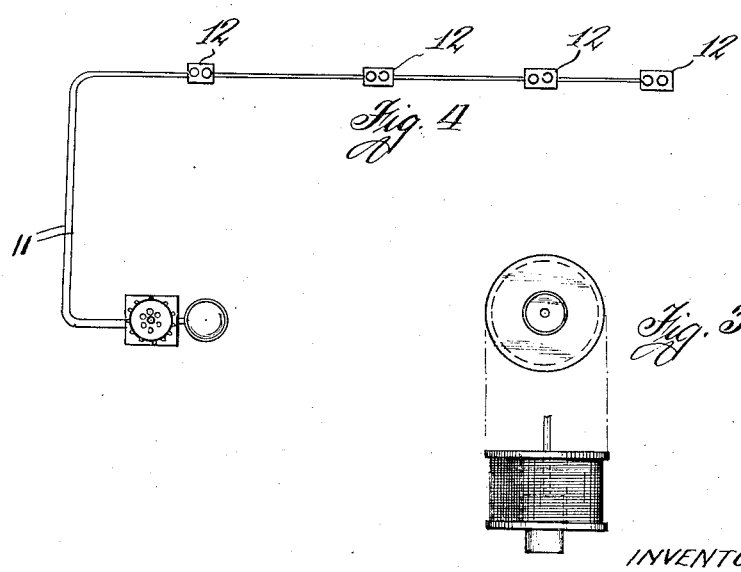
INVENTOR
BY PATVON JACOBS.
ATTORNEY
E.H.Bond

UNITED STATES PATENT OFFICE.

PATYON JACOBS, OF MONTREAL, QUEBEC, CANADA.

FIRE-EXTINGUISHER.

1,389,049. Specification of Letters Patent. Patented Aug. 30, 1921.

Application filed July 3, 1920. Serial No. 393,966.

*To all whom it may concern:*

Be it known that I, PATYON JACOBS, a citizen of the Dominion of Canada, residing at Montreal, in the county of Hochelaga and Province of Quebec, Canada, have invented certain new and useful Improvements in Fire-Extinguishers, of which the following is a specification.

This invention relates to improvements in fire extinguishers, and has for its principal object a globular-shaped container having particularly designed nozzles radiating in all directions so that when water is forced into said container it will be spread all over the room in which the extinguisher is located.

With this and other objects in view, the invention consists in the construction, combination and arrangement of parts as will be hereinafter fully described, illustrated in the accompanying drawings, and pointed out in the claims hereunto appended.

Figure 1 is a perspective view of my invention part being shown sectionally,

Fig. 2 is an enlarged view of the valve construction,

Fig. 3 is an enlarged view of the operating means, and

Fig. 4 is a plan view showing how the room would be wired up.

Referring to the drawings like numerals designate like parts in the various figures.

Referring more particularly to the drawings in detail, the numeral 5 is a pressure water tank having an inlet 6 and an outlet pipe 7.

8 is a casing in which is suitably mounted magnetic member 9 having a hollow center for the purpose hereinafter described. 10 is a set of batteries for giving the desired current used in connection with operating the magnetic member 9. 11 is suitable electric wires making a connection between the said batteries, the said magnetic member and thermostats 12, which thermostats may be positioned around the room in any suitable position and attached to the walls or ceiling as will be found most convenient. When the heat from a fire operates one of the thermostats 12, the thermostats will make a connection so as to operate the magnetic member 9.

Suitably positioned on the casing 8 is a globular container 14 supported on suitable brackets 15. The container 8 and the globular member 14 have openings 16 and 17 respectively, which openings register opposite each other. The openings 17 may have any desired packing arrangement 18 so as to make a tight connection opening through which an operating rod 19 is adapted to reciprocate. On the lower end of the rod 19 is a head 20 which is controlled by the magnetic member 9.

The globular member 14 is provided with orifices 21 which are threaded to receive the inner exteriorly threaded end of the nozzles 22. These openings are in spaced relationship to each other all around the globular member 14.

The outlet pipe 17 from the pressure tank 5 connects into the globular member 14 through an opening 23 and is connected to the upper end of a valve 24. The valve 24 is illustrated more particularly in Fig. 2. 25 is the inlet port into which connects the piping 7. This valve is provided with a longitudinal opening 26 and transverse oppositely positioned outlet ports 27. 28 is a plunger member adapted to reciprocate in the opening 26 and is mounted on the upper end of the rod 19 so that when the magnetic member 9 is charged it will pull the head 20 upwardly so that the plunger 28 will be forced upwardly in the opening 26. The plunger 28 is provided with a longitudinal opening 29 extending outwardly from its upper end and connecting to the transverse opening 30. The plunger 28 is so positioned on the rod 19 that when it is in its uppermost position, the opening 30 registers opposite the opening 27 so that the water held under pressure in the tank 5 will enter the globular member 14 through the piping 7, through the port 25, down through the longitudinal opening 29, bifurcating through the openings 30 so as to be forced out through the openings 27 into the interior of the globular member 14, and when in this it will be spread out through the nozzles 22 to all directions in the room.

From the foregoing it is thought that the construction of my invention will be clearly understood, and, therefore, a more extended explanation has been omitted.

What I claim as new, is,—

1. A fire extinguisher consisting of a pressure tank, a water inlet means to said tank, a water outlet means from said tank, a casing, magnetic means in said casing, batteries in said casing, thermostats suitably positioned around a room, wire connections between said thermostats and said battery and magnetic means, a globular member mounted on said casing, said globular member having radial spaced openings, nozzles threaded into the said openings, said outlet pipe extending into said globular member and threadedly engaged to a valve, said valve having a longitudinal opening and a transverse set of openings, a plunger in said longitudinal opening having a longitudinal opening therein and a transverse opening, which transverse opening registers opposite said transverse openings when said plunger is in uppermost position, an operating rod attached at its upper end to the lower end of said plunger and extending through said globular member, and a head in the lower end of said rod so positioned as to be operated by said magnetic means.

2. A pressure tank having an inlet means and an outlet means, a globular member having radial spaced openings therein, suitable nipples threadedly engaged in said openings, said outlet extending into said globular member, a valve control means inside said globular member for controlling the entrance of water from said outlet into said globular member, an operating rod extending from said valve, a magnetic means for controlling the operation of said rod, and thermostats positioned in any suitable position for operating said magnetic means.

In testimony whereof I affix my signature in the presence of two witnesses.

PATYON JACOBS.

Witnesses:
PHILIP VANTIER,
GERTRUDE SMITH.